United States Patent
Arya

(10) Patent No.: US 9,122,880 B2
(45) Date of Patent: Sep. 1, 2015

(54) SENSITIVE PERSONAL INFORMATION DATA PROTECTION

(71) Applicant: Cellco Partnership, Arlington, VA (US)

(72) Inventor: Siddhartha Kumar Arya, Cumming, GA (US)

(73) Assignee: Cellco Partnership, Basking Ridge, NJ (US)

(*) Notice: Subject to any disclaimer, the term of this patent is extended or adjusted under 35 U.S.C. 154(b) by 113 days.

(21) Appl. No.: 13/829,638

(22) Filed: Mar. 14, 2013

(65) Prior Publication Data

US 2014/0283089 A1    Sep. 18, 2014

(51) Int. Cl.
*G06F 7/76* (2006.01)
*G06F 21/60* (2013.01)
*G06F 21/62* (2013.01)

(52) U.S. Cl.
CPC ............ *G06F 21/60* (2013.01); *G06F 21/6245* (2013.01); *G06F 7/76* (2013.01)

(58) Field of Classification Search
CPC ........................................................ G06F 7/76
USPC .......................................................... 726/26
See application file for complete search history.

(56) References Cited

U.S. PATENT DOCUMENTS

2007/0110224 A1* 5/2007 Gumpel et al. ................. 380/28

FOREIGN PATENT DOCUMENTS

JP          2008033411 A  *  2/2008

OTHER PUBLICATIONS

Machine translation of JP 2008033411 A.*

* cited by examiner

*Primary Examiner* — Jacob Lipman

(57) ABSTRACT

A computing device may be configured to provide operations related to providing additional security for sensitive personal information (SPI) in data records of an enterprise. The SPI is extract from the data records and mask sequence values associated with the SPI are generated. A master translation table is updated with the association of the mask sequence values to the entries of SPI and the mask sequence values are merged into the data records to be used in place of the SPI to safeguard the SPI. The table containing the mask sequence values is stored separately.

21 Claims, 6 Drawing Sheets

FIG. 4A

| SPI Identifier | Primary Key |
|---|---|
| 12-3456789 | abcfg |
| 98-7654321 | xcysfllk |
| 01-3334345 | jx34d4f4f |
| 12-3456790 | fg2345jkl |
| 43-2156789 | hjkllsp989 |
| 67-8954321 | uytuykjjh |
| 74-5348768 | dgdggfjujk |
| 53-2347657 | tyju456934 |
| 34-5762321 | turghjkrl |
| 26-7564567 | 76jhfkkffgl |
| 00-3244563 | rr53378f56 |

FIG. 4B

| SPI Identifier | Mask Sequence Value |
|---|---|
| ... | ... |
| 00-3244563 | T2633364334 |
| 00-6544563 | T2633364335 |
| 01-3334345 | T2633364336 |
| ... | ... |

| SPI Identifier | Primary Key |
|---|---|
| 12-3456789 | abcfg |
| 98-7654321 | xcysfllk |
| 12-3456790 | fg2345jkl |
| 43-2156789 | hjkllsp989 |
| 67-8954321 | uytuykjjh |
| 74-5348768 | dgdggfjujk |
| 53-2347657 | tyju456934 |
| 34-5762321 | turghjkrl |
| 26-7564567 | 76jhfkkffgl |

FIG. 4C

| SPI Identifier | Random Value |
|---|---|
| 12-3456789 | 9645689992977345347 |
| 98-7654321 | 8745766385902034848 9 |
| 12-3456790 | 3464878989800590955 9 |
| 43-2156789 | 7736436668926349395 6 |
| 67-8954321 | 8988347803707080024 7 |
| 74-5348768 | 1228738797473477470 9 |
| 53-2347657 | 8897897897398747997 7 |
| 34-5762321 | 8668565098898988823 3 |
| 26-7564567 | 7866685875785866686 9 |

FIG. 4D

| SPI Identifier | Random Value |
|---|---|
| 74-5348768 | 1228738797473477470 9 |
| 12-3456790 | 3464878989800590955 9 |
| 43-2156789 | 7736436668926349395 6 |
| 26-7564567 | 7866685875785866686 9 |
| 34-5762321 | 8668565098898988823 3 |
| 98-7654321 | 8745766385902034848 9 |
| 53-2347657 | 8897897897398747997 7 |
| 67-8954321 | 8988347803707080024 7 |
| 12-3456789 | 9645689992977345347 |

FIG. 4E

| SPI Identifier | Mask Sequence Value |
|---|---|
| 74-5348768 | T2654387684S6 |
| 12-3456790 | T2654387684S7 |
| 43-2156789 | T2654387684S8 |
| 26-7564567 | T2654387684S9 |
| 34-5762321 | T26543876460 |
| 98-7654321 | T26543876461 |
| 53-2347657 | T26543876462 |
| 67-8954321 | T26543876463 |
| 12-3456789 | T26543876464 |

FIG. 4F

| SPI Identifier | Mask Sequence Value | Primary Key |
|---|---|---|
| (NULL) | T26543876464 | abcfg |
| (NULL) | T26543876461 | xcysfllk |
| (NULL) | T26333456 4336 | jx34d4f4f |
| (NULL) | T26543876457 | fg2345jkl |
| (NULL) | T26543876458 | hjkllsp989 |
| (NULL) | T26543876463 | uytuykjjh |
| (NULL) | T26543876456 | dgdggfjujk |
| (NULL) | T26543876462 | tyju456934 |
| (NULL) | T26543876460 | turghjkrl |
| (NULL) | T26543876459 | 76jhfkkffgl |
| (NULL) | T26333456 4334 | rr53378f56 |

SENSITIVE PERSONAL INFORMATION DATA PROTECTION

BACKGROUND

Corporations and governments may impose requirements on data storage through policies and regulations. For example, these requirements may include details on the proper storage of sensitive personal information. Sensitive personal information may include various elements of personal information about an individual or business that the individual or business may prefer be kept private. In some cases, data storage systems may predate or fail to account for all applicable regulations, leaving sensitive personal information insufficiently safeguarded. As some examples, sensitive personal information may be exposed in database tables or displayed in user interfaces to users who should not have access to the information. When sensitive personal information is exposed to unauthorized persons by internal software applications or external data views, the data breach may potentially cause corporate liability.

BRIEF DESCRIPTION OF THE DRAWINGS

FIG. 4A illustrates an exemplary collection of extracted data including sensitive personal information and primary key information extracted from data records.

FIG. 4B illustrates an exemplary collection of extracted data purged according to a master translation.

FIG. 4C illustrates an exemplary assignment of random values to the entries of the exemplary collection of extracted data.

FIG. 4D illustrates an exemplary sorting of the entries of the exemplary collection of extracted data according to the assigned random values.

FIG. 4E illustrates an exemplary assignment of mask sequence values to the sensitive personal information based on the random ordering.

FIG. 4F illustrates exemplary data records updated to use mask sequence values in place of the sensitive personal information.

DETAILED DESCRIPTION

A system may be designed to safeguard sensitive personal information included in data records by replacing the sensitive personal information with generated mask identifiers that cannot be reversed by a receiving party. The mask identifiers may be used in place of the sensitive personal information for tasks not requiring the sensitive personal information (such as database join operations), and the encrypted sensitive personal information may be stored in a secure location indexed to the mask identifiers for retrieval by those tasks that do require the sensitive personal information (such as tax form generation). Thus, the system may facilitate the provisioning of information provided for by use of sensitive personal information, while at the same time maintaining data privacy according to applicable corporate and governmental requirements.

Figure 1:
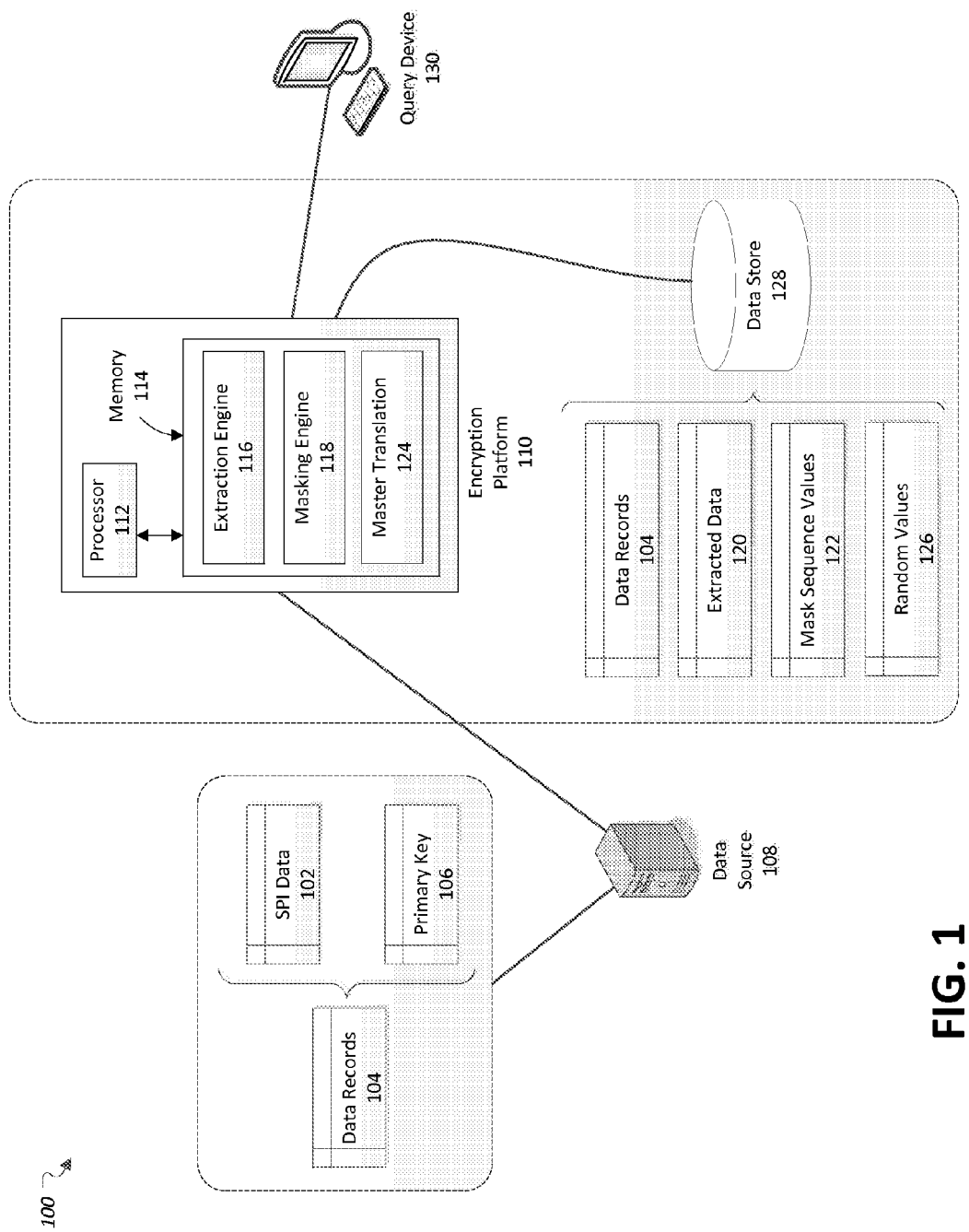
FIG. 1 illustrates an exemplary system for safeguarding sensitive personal information.

FIG. 1 illustrates an exemplary system 100 for safeguarding sensitive personal information 102. The system 100 may include one or more data sources 108 storing sensitive personal information 102 and primary key 106 information in data records 104. The system 100 may further include an encryption platform 110 in communication with the data source 108. The encryption platform 110 may include a processor 112 that execute instructions stored on a memory 114, such as those of an extraction engine 116 and a masking engine 118. The extraction engine 116 may be configured to cause the encryption platform 110 to generate extracted data 120 based on data records 104 received from the data sources 108. The masking engine 118 may be configured to cause the encryption platform 110 to secure the extracted data 120 by generating mask sequence values 122 using a master translation 124 and random values 126. The encryption platform 110 may be in communication with a data store 128 configured to store information such as the extracted data 120, mask sequence values 122, and random values 126. The master translation 124 may be stored in the memory 114 or at another secure location separate from the data store 128. The system 100 may further include a query device 130 facilitating use of the data records 104 while safeguarding the sensitive personal information 102. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The sensitive personal information 102 may include various elements of personal information about an individual or business that the individual or business may prefer be kept private. Sensitive personal information 102 may relate to various personal or private aspects of a person or corporation, and may include financial, medical, political, relationship, or personally-identifiable information that can be used to identify a person or corporation. Exemplary types of sensitive personal information 102 may include tax identifiers, social security numbers, dates of birth, and driver's license numbers.

The data records 104 may include information regarding individuals or business that may be generated or maintained in the ordinary course of business. Exemplary types of data records 104 may include billing information, credit score information, and human resources information, as some examples. To facilitate identification and user of the data records 104, each record 104 in the data records 104 may be associated with a unique primary key 106. The primary key 106 may be composed of one or more fields of the data records 104 that uniquely identify each individual data record 104. Due to the relative uniqueness of many types of sensitive personal information 102 within a dataset (e.g., tax identifiers or social security numbers), fields of sensitive personal information 102 lend themselves to use as database fields, indexes or primary keys 106 in database tables. As a result, sensitive personal information 102 fields may be included in the data records 104 for use as unique identifiers rather than for use for the specific information contained within.

The data source 108 may include one or more sources of data records 104. For example, a billing information source may provide data records 104 related to billing, while a credit information data source 108 may provide data records 104 related to credit scores. While only a single data source 108 is shown in FIG. 1, systems 100 including multiple data sources 108 are likely. In some cases, multiple data sources 108 may include fields holding the same type or types of sensitive personal information 102.

The encryption platform 110 may be configured to receive data records 104 from the data sources 108. For example, the encryption platform 110 may receive data records 104 or related files including sensitive personal information 102 at a predetermined time of day, or during a certain time window or period (e.g., by 10:00 AM daily). In some cases the data records 104 may be received in an encrypted form, while in other cases the data records 104 may be received in a decrypted or plain text form. These received data records 104 may be decrypted (if necessary) and stored in a storage location associated with the encryption platform 110 for further processing (e.g., in the data store 128).

The encryption platform 110 may be further configured to utilize an extraction engine 116 to extract sensitive personal information 102 from the stored data records 104. For example, the extraction engine 116 may be configured to extract fields of sensitive personal information 102 from the stored data records 104 (e.g., tax identifiers, social security numbers, dates of birth, driver's license numbers, etc.). The extraction engine 116 may be further configured to extract fields including primary key 106 fields to allow the extraction engine 116 to maintain the association of the extracted data 120 with the data records 104. These extracted sensitive personal information 102 and primary key 106 fields may be referred to as extracted data 120.

Once the extract sensitive personal information 102 has been extracted from the data records 104, the extraction engine 116 may be further configured to remove the sensitive personal information 102 from the data records 104, such as by overwriting the data in the sensitive personal information 102 columns or fields with other values (e.g., NULL) or by removing the fields containing the sensitive personal information 102 entirely. The extraction engine 116 may further archive the data records 104 having sensitive personal information 102 removed for storage and later use. Further aspects of the operation of the extraction engine 116 are discussed with respect to the process 200 illustrated in FIG. 2.

The encryption platform 110 may be further configured to utilize a masking engine 118 to generate mask sequence values 122 for the sensitive personal information 102 extracted from the stored data records 104. The mask sequence value 122 may be arbitrary identifiers unique to respective elements of sensitive personal information 102. Thus, the mask sequence values 122 may be used in database operations in place of the sensitive personal information 102 and without exposing the underlying sensitive personal information 102 values. In some examples the mask sequence values 122 may be generated as a sequence of numbers or other characters starting from an arbitrary value (e.g., 0, 1, 123456, 51234345, ABCD, etc.), such that each additional element of sensitive personal information 102 is assigned a next available value in the sequence.

In some cases, different sequences of mask sequence values 122 may be used for masking different types of sensitive personal information 102 (e.g., a first sequence for social security numbers, a second sequence for tax identifiers, etc.). To allow these different sequences to be distinguishable (e.g., to be stored in the same database fields or column), in some examples the masking engine 118 may include an identifier in the mask sequence value 122 indicative of the type of sensitive personal information 102 with which the mask sequence value 122 is associated. As one example, social security mask sequence values 122 may be prefixed with an "S", while tax identifier mask sequence values 122 may be prefixed with a "T".

The masking engine 118 may be configured to periodically collect and decrypt the extracted data 120 created by the extraction engine 116 to perform the generation of mask sequence values 122. The masking engine 118 may be further configured to determine whether any elements of sensitive personal information 102 in the extracted data 120 are already associated with mask sequence values 122 by verification against a master translation 124. The master translation 124 may include a mapping of elements of sensitive personal information 102 to generated mask sequence values 122. Accordingly the master translation 124 may serve to allow the system 100 to translate between mask sequence values 122 and elements of sensitive personal information 102, as well as to identify whether an element of sensitive personal information 102 already is associated with a mask sequence value 122. To provide for enhanced security, the master translation 124 may be stored in a secure storage location separate from the data store 128, such as in a memory 114 of the encryption platform 110. In some examples, the master translation 124 may be stored at a separate location such as a third device other than the data store 128 or the encryption platform 110.

For entries that are not in the master translation 124, the masking engine 118 may be further configured to generate random values 126 to associate with the entries of the extracted data 120 including the elements of sensitive personal information 102, randomly assign the generated random values 126 to the entries of the extracted data 120, and sort the entries of the extracted data 120 according to the random values 126. Random values 126 may be determined by the masking engine 118 according to various methodologies. As an example, the random values 126 may be generated as twenty digit random values using a pseudo-random number generation algorithm (e.g., a linear congruential generator or an inversive congruential generator), initialized according to a seed value.

The masking engine 118 may be further configured to assign mask sequence values 122 to the entries of the extracted data 120 sorted according to the random ordering, tie the mask sequence values 122 back to the stored data records 104 according to the extracted primary key 106, and update a master translation 124 to further include mapping of the additional mask sequence values 122 to corresponding entries of sensitive personal information 102. Further aspects of the operation of the masking engine 118 are discussed in detail with respect to the process 300 illustrated in FIG. 3, and the exemplary data translation discussed with respect to FIGS. 4A-4E.

The query device 130 may be configured to access the encryption platform 110 to facilitate access to the data of the data store 128. For example, the query device 130 may validate access of a user, and may selectively provide access to the stored data records 104 based on the level of access of the user. Some users may have access to query the stored data records 104 but may only be able to view the mask sequence values 122 in place of the sensitive personal information 102. Other users who have a greater level of access may be able to further request for translation of the mask sequence values 122 into the underlying sensitive personal information 102 through use of the master translation 124. Thus, the system 100 may facilitate the provisioning of information to users provided for by use of sensitive personal information 102 as identifiers, while at the same time maintaining data privacy from users who are not authorized to view the underlying sensitive personal information 102.

Figure 2:
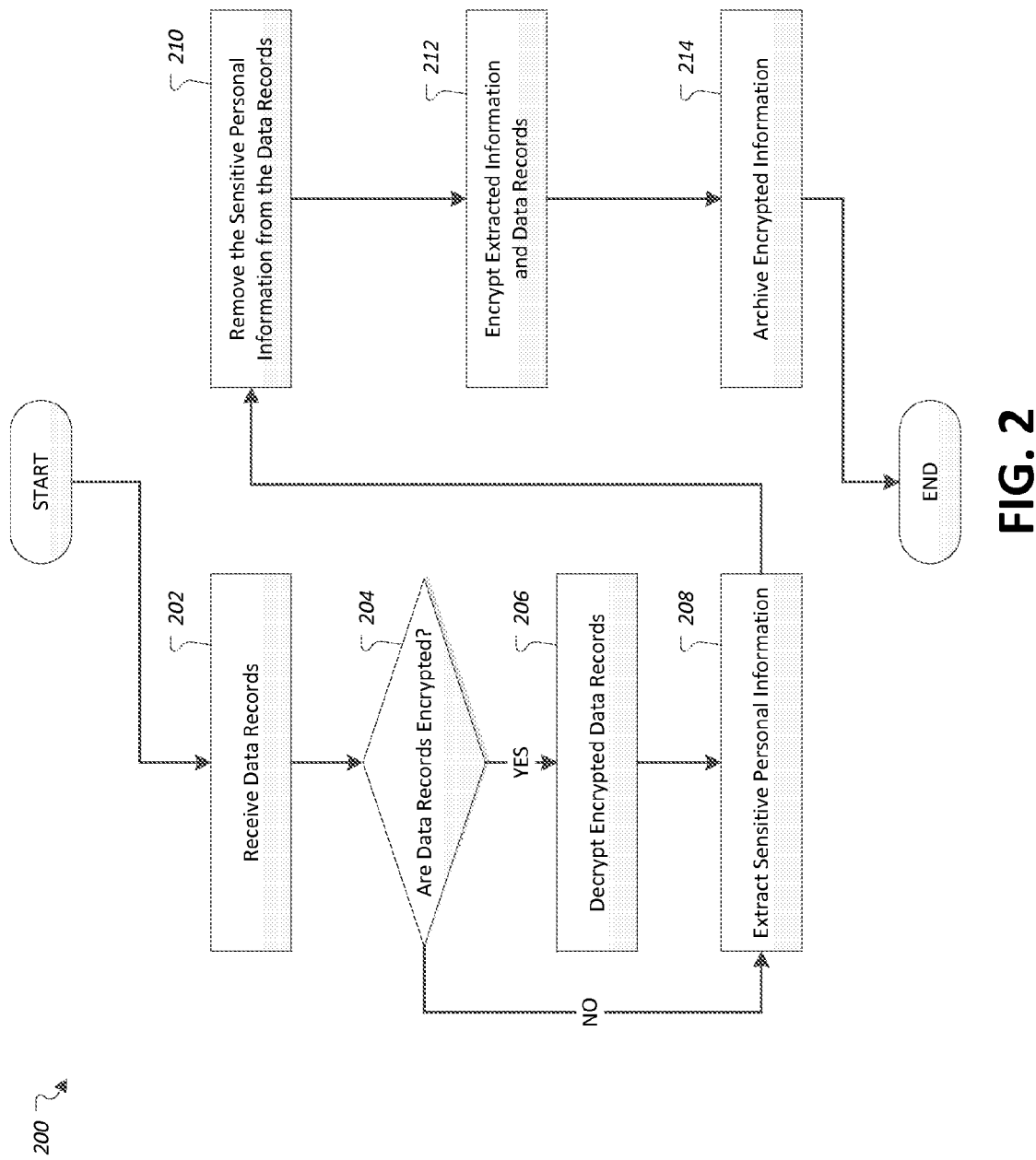
FIG. 2 illustrates an exemplary process for processing data records including sensitive personal information.

FIG. 2 illustrates an exemplary process 200 for processing data records 104 including sensitive personal information 102. The process 200 may be performed, for example, by an encryption platform 110 in communication with one or more data stores 108 and executing an extraction engine 116.

In block 202, the encryption platform 110 receives data records 104. For example, the encryption platform 110 may receive data records 104 or related files including sensitive personal information 102 at a predetermined time of day, or during a certain time window or period (e.g., by 10:00 AM daily). The data records 104 may include stored information regarding individuals or businesses. As a result, the data records 104 may include fields of sensitive personal information 102. The encryption platform 110 may further store the received data records 104 in a secured location for further processing.

In decision point 204, the encryption platform 110 determines whether the received data records 104 require decryption. For example, the encryption platform 110 may identify that data records 104 may require decryption, or that certain data fields included in the data records 104 may require decryption. This may be determined, for example, based on identifying from what data source 108 the data records 104 were received (e.g., from a particular database or a particular database table), or based on another factors (e.g., a flag indicative that the data has been encrypted, a data signature indicative of encrypted data, etc.) In other cases, the data sources 108 may send data records 104 in a decrypted plain text format. If decryption is required, control passes to block 206. Otherwise, control passes to block 208.

In block 206, the encryption platform 110 decrypts the data records 104. For example, the encryption platform 110 may invoke a security module to decrypt the received encrypted data records 104. In some cases, the security module may implement the RSA algorithm for public-key cryptography, but other encryption/decryption methodologies are possible depending on the encryption performed on the data records 104.

In block 208, the encryption platform 110 extracts sensitive personal information 102 from the data records 104 to create extracted data 120. For example, the encryption platform 110 may extract data fields from the data records 104 that include sensitive personal information 102 (e.g., social security numbers, tax identifiers). The encryption platform 110 may be further configured to extract fields including primary key 106 fields to maintain the association of the extracted data 120 with the data records 104, such that the data may be tied back using the primary key 106 to limit the scope of the update, as the update may be performed on a live data table, e.g., in which data records 104 are being added.

In block 210, the encryption platform 110 removes the sensitive personal information 102 from the data records 104. For example, the encryption platform 110 may overwrite the data in the sensitive personal information 102 columns or fields with other values (e.g., NULL or false values that have the same format as the real values). As another example, the encryption platform 110 may remove the columns or fields containing the sensitive personal information 102 from the data records 104.

In block 212, the encryption platform 110 encrypts the extracted data 120 and the data records 104. For example, the encryption platform 110 may utilize the security module to encrypt the extracted data 120 (e.g., including primary key 106 information and sensitive personal information 102). The encryption platform 110 may further encrypt the data records 104 with sensitive personal information 102 removed for storage in the data store 128.

In block 214, the encryption platform 110 archives the encrypted information. For example, the encryption platform 110 may store the re-encrypted data records 104 and the encrypted extracted data 120 in the data store 128 for further processing. The stored data records 104 and extracted data 120 may therefore be maintained in an encrypted form when not in active use. The data may be maintained in the archive for a predetermined amount of time, such as thirty days, to balance available storage space with ready access to the archived information. After block 214, the process 200 ends.

Figure 3:
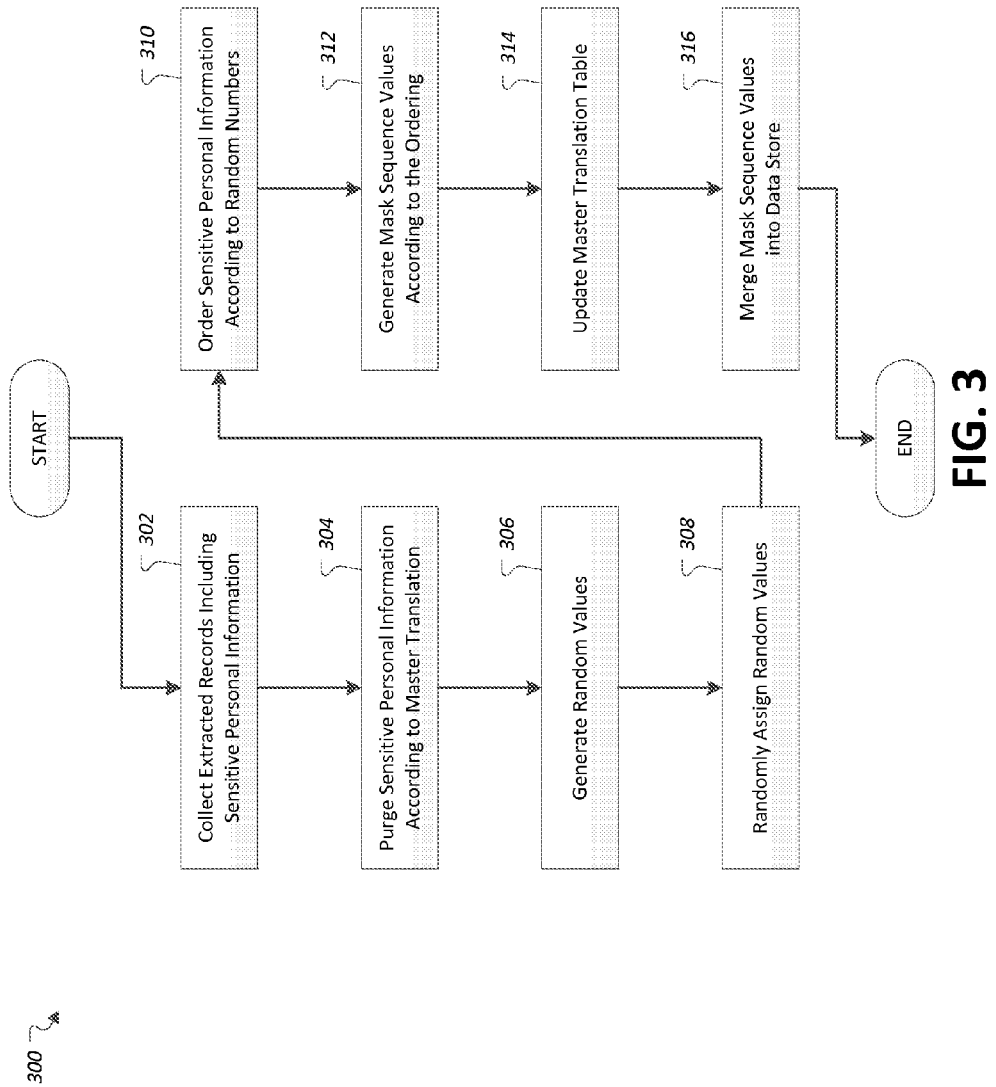
FIG. 3 illustrates an exemplary process for generating mask identifiers to use in place of the sensitive personal information.

FIG. 3 illustrates an exemplary process 300 for generating mask identifiers to use in place of the sensitive personal information. The process 300 may be performed, for example, by an encryption platform 110 executing a masking engine 118.

In block 302, the encryption platform 110 collects extracted data 120 including sensitive personal information 102. For example, encryption platform 110 may periodically collect extracted data 120 received from various data sources 108 over the last time period (e.g., last day, previous week) for processing. In some cases, the encryption platform 110 may concatenate the multiple received data records 104 or files into a single input feed to facilitate further processing.

In block 304, the encryption platform 110 purges sensitive personal information 102 identifiers from further processing. For example, if an element of sensitive personal information 102 is already associated with a mask sequence value 122 in the master translation 124, then the encryption platform 110 may not generate an additional mask sequence value 122 for that element. On the other hand, if an element if sensitive personal information 102 is not yet included in the master translation 124, then processing for that element should continue to allow for the generation of an associated mask sequence value 122.

In some cases, multiple data sources 108 may include fields holding the same type or types of sensitive personal information 102. In such cases, a master translation 124 may be utilized across the multiple data sources 108. This may be done, for example, to maintain data relationships depending on consistency of the sensitive personal information 102 across the multiple data sources 108. In other cases where these types of relationships between data sources 108 are to be hidden, different data sources 108 may utilize different master translations 124, thereby resulting in incompatible mask sequence values 122. In such a case, the master translation 124 to be used may be identified by the encryption platform 110 according to originating data source 108 of the data records 104, as an example. As another possibility, the master translation 124 to be used may be determined according to an identifier included in the mask sequence values 122. For instance, social security mask sequence values 122 prefixed with an "S" may use a first master translation 124, while tax identifier mask sequence values 122 prefixed with a "T" may use a second master translation 124.

In block 306, the encryption platform 110 generates random values 126. For example, the encryption platform 110 may generate a quantity of random values 126 sufficient that each element of sensitive personal information 102 for which a mask sequence value 122 is to be determined may be associated with one of the generated random values 126. The random values 126 may be generated according to various schemes, such as by generation of twenty digit random values using a random number generator.

In block 308, the encryption platform 110 randomly assigns the random values 126 to the elements of sensitive personal information 102. For example, the encryption platform 110 further utilize a random number generator to assign the random values 126 to the elements of sensitive personal information 102 in a random order. In other examples, the encryption platform 110 may assign the random values 126 to the ordering of sensitive personal information 102 without random reordering of the random values 126, or may randomize the ordering of the elements of sensitive personal information 102 instead of the ordering of random values 126.

In block 310, the encryption platform 110 sorts the elements of sensitive personal information 102 according to the random values 126. For example, the encryption platform 110 may sort the random values 126 associated with respective elements of sensitive personal information 102 in numerical order, and may accordingly reorder the elements of sensitive personal information 102 associated with the sorted ordering of the random values 126. Thus, the ordering of the elements of sensitive personal information 102 may be randomized.

In block 312, the encryption platform 110 generates mask sequence values 122 according to the random reordering of the elements of sensitive personal information 102. For example, the encryption platform 110 may determine a last used mask sequence value 122 or a next available mask sequence value 122 to use in generation of the mask sequence values 122. As some examples, the last used or next available value may be determined according to a database query for highest mask sequence values 122, a database stored procedure configured to provide a next value to use, or a maintained last-used value stored in the data store 128 or in the memory 114 of the encryption platform 110. From that starting value, the encryption platform 110 may assign each of the elements of sensitive personal information 102 the next mask sequence values 122 in sequence according to the random sorted order of the elements of sensitive personal information 102. Thus, while the mask sequence value 122 may be of a sequence, the random ordering of the elements of sensitive personal information 102 may prevent reversing of the mask sequence value 122 back into the associated element of sensitive personal information 102.

In block 314, the encryption platform 110 updates the master translation 124. For example, the master translation 124 may be updated to include the generated mask sequence values 122 assigned to the elements of sensitive personal information 102. The master translation 124 may accordingly maintains a current mapping of the generated mask sequence values 122 to allow a user with sufficient permission to be able to determine the underlying sensitive personal information 102 for instances that require such information.

In block 316, the encryption platform 110 merges the mask sequence values 122 into the data store 128. For example, mask sequence values 122 may be inserted into the data records 104 to be used in place of the removed sensitive personal information 102. The appropriate mask sequence values 122 may be returned to the correct respective data records 104 according to the primary key 106 information included in the extracted data 120 and in the data records 104 stored in the data store 128.

In some cases, the merge may be performed according to a SQL merge or "upsert" statement with a condition such that the primary key 106 of the mask sequence values 122 matches that of the primary key 106 of the data records 104 of the data store 128, then the mask sequence values 122 are inserted into the corresponding data records 104. The merge operation may be tied back using the primary key 106 to limit the scope of the update, as the update may be performed on a live data table in which data records 104 are being added (e.g., from data sources 108). Accordingly, the updating of the data records 104 using the primary key 106 may allow for the updating to be performed without disturbing other database records 104. It is possible, however, that in some examples a data substitution of the sensitive personal information 102 with the mask sequence values 122 may be performed without requiring the use of a primary key 106. Thus, the merged data records 104 may be made available for access and querying by users of the system 100 (e.g., via the query device 130), without compromising sensitive personal information 102. After block 316, the process 300 ends.

Variations on the process 300 are possible. For example, in cases in which multiple types of sensitive personal information 102 are included, the different types of sensitive personal information 102 may be randomly sorted separately according to type. As another example, in cases in which multiple types of sensitive personal information 102 are included, the encryption platform 110 may utilize different master translations 124 according to types of sensitive personal information 102.

FIGS. 4A-4F illustrate an exemplary safeguarding of sensitive personal information 102 that may be performed by the system 100. More specifically, FIG. 4A illustrates an exemplary collection of extracted data 120 including sensitive personal information 102 and primary key 106 information extracted from data records 104. In the illustrated example, the elements of sensitive personal information 102 included in the extracted data 120 may be tax identifiers from a column of received data records 104 from a billing data source 108.

FIG. 4B illustrates an exemplary collection of extracted data 120 purged according to a master translation 124. For example, each element of sensitive personal information 102 of the extracted data 120 may be compared against the master translation 124 to remove any elements of sensitive personal information 102 for which masked sequence values 122 have already been generated. As illustrated, masked sequence values 122 already exist for two of the sensitive personal information 102 elements that also appear in the extracted data 120 (i.e., 00-3244563 and 01-3334345 appear in both). Thus, these records may be removed from the extracted data 120 for purposes of masked sequence value 122 generation.

FIG. 4C illustrates an exemplary assignment of random values 126 to the entries of the exemplary collection of extracted data 120. For example, the random values 126 may be generated as twenty digit random numerical values, but other sizes and types of random values 126 may be utilized as well.

FIG. 4D illustrates an exemplary sorting of the entries of the exemplary collection of extracted data 120 according to the assigned random values 126. As shown, the sorting may be performed in numerical order, but other types of sorting may be possible.

FIG. 4E illustrates an exemplary assignment of mask sequence values 122 to the sensitive personal information 102 based on the random ordering. For example, the system 100 may assign each of the elements of sensitive personal information 102 a next available mask sequence value 122 according to the ordering, and may include a prefix indicative of the tax identifier nature of the sensitive personal information 102 being protected. The master translation 124 may be updated to further include the association of the assigned mask sequence values 122 and sensitive personal information 102 for future use.

FIG. 4F illustrates exemplary data records 104 updated to use mask sequence values 122 in place of the sensitive personal information 102. As illustrated, the mask sequence values 122 may be applied back to the data records 104 according to the updated master translation 124, and the sensitive personal information 102 may be removed from the data records 104. In some cases, the sensitive personal information 102 column may be removed, or may be used to store the mask sequence values 122 instead of the sensitive personal information 102.

Thus, through use of the system 100, sensitive personal information 102 may be hidden behind mask sequence values 122 in data records 104, while still maintaining the relationship of the data records 104 to one another. As the generated mask sequence values 122 cannot be reversed by a party lacking access to the master translation 124, the sensitive personal information 102 included in the data records 104 may be safeguarded. Moreover, due to the one-to-one correspondence of the mask sequence values 122 to the sensitive personal information 102 within data records 104 of a data source 108, any database queries formerly used to join or query against records by sensitive personal information 102 may easily use the mask sequence values 122 instead. Moreover, for examples in which the mask sequence values 122 and master translation 124 are shared among multiple data sources 108, database queries of data records 104 across the data sources 108 may also be able to easily use the mask sequence values 122. Thus, the mask sequence values 122 may be used in place of the sensitive personal information 102 for tasks not requiring the sensitive personal information 102. While the queries may still properly function, users who should not have access to the underlying sensitive personal information 102 may instead see only the mask sequence values 122, which do not contain enough information to allow the user to reverse the mask sequence values 122 back into the sensitive personal information 102. For those users who do require use of the sensitive personal information 102, the query device 130 may allow those users to be validated for access, and then be provided with the underlying sensitive personal information 102 through use of the master translation 124.

In general, computing systems and/or devices, such as the system 100 including the encryption platform 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the encryption platform 110 generally include computer-executable instructions such as the instructions of the extraction engine 116 and masking engine 118, where the instructions may be executable by one or more processors 112. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor 112 or microprocessor receives instructions, e.g., from a memory 114, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 112 of a computing device). Such a medium may take many forms, including, but not limited to, non-volatile media and volatile media. Non-volatile media may include, for example, optical or magnetic disks and other persistent memory 114. Volatile media may include, for example, dynamic random access memory 114 (DRAM), which typically constitutes a main memory 114. Such instructions may be transmitted by one or more transmission media, including coaxial cables, copper wire and fiber optics, including the wires that comprise a system bus coupled to a processor 112 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory 114 chip or cartridge, or any other medium from which a computer can read.

Databases, data repositories or other data stores described herein, such as the data store 128, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The extraction engine 116 and masking engine 118 such computer program products. In some example, one or more of the extraction engine 116 and masking engine 118 may be provided as software that when executed by the processor 112 provides the operations described herein. Alternatively, one or more of the extraction engine 116 and masking engine 118 may be provided as hardware or firmware, or combinations of software, hardware and/or firmware. Although one example of the modularization of the encryption platform 110 including an extraction engine 116 and masking engine 118 is illustrated and described, it should be understood that the operations thereof may be provided by fewer, greater, or differently named modules.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device configured to provide operations comprising:
   receiving a plurality of entries of sensitive personal information extracted from data records;
   sorting the plurality of entries into an ordering;
   for each of the plurality of entries, beginning with a first one of the plurality of entries in the ordering and proceeding sequentially through the ordering, determining a mask sequence value that is a next available value in a predetermined sequence of values and assigning the mask sequence value to the entry;
   updating a master translation table that stores mask sequence values in association with entries of sensitive personal information such that the master translation table includes the plurality of entries of sensitive personal information in association with their respective assigned mask sequence values; and
   merging the determined mask sequence values into the data records to be used in place of the respective entries of sensitive personal information to which the mask sequence values have been assigned to safeguard the sensitive personal information.

2. The computing device of claim 1, further configured to provide operations comprising purging particular entries of sensitive personal information from being assigned mask sequence values according to whether the particular entries of sensitive personal information already are included in the master translation table.

3. The computing device of claim 1, further configured to provide operations comprising:
   receiving the data records from at least one data source;
   extracting the sensitive personal information and primary key information from the data records for inclusion in the data records; and
   merging the mask sequence values into the data records according to the primary key information.

4. The computing device of claim 1, further configured to provide operations comprising removing the sensitive personal information from the data records prior to merging the mask sequence values into the data records.

5. The computing device of claim 1, further configured to provide operations comprising including an identifier in the mask sequence value indicative of the type of sensitive personal information with which the mask sequence value is associated.

6. The computing device of claim 1, wherein the ordering is a random ordering.

7. The computing device of claim 6, wherein the sorting the plurality of entries into the ordering comprises:
   generating a set of random values;
   randomly assigning the random values to the entries of sensitive personal information; and
   sorting the plurality of entries of sensitive personal information such that their respective assigned random values are in numerical order.

8. A method, comprising:
   receiving, at an encryption platform executing a masking engine, a plurality of entries of sensitive personal information extracted from data records;
   sorting, by the encryption platform, the plurality of entries into an ordering;
   for each of the plurality of entries, beginning with a first one of the plurality of entries in the ordering and proceeding sequentially through the ordering, determining, by the encryption platform, a mask sequence value that is a next available value in a predetermined sequence of values and assigning the mask sequence value to the entry;
   updating, by the encryption platform, a master translation table that stores mask sequence values in association with entries of sensitive personal information such that the master translation table includes the plurality of entries of sensitive personal information in association with their respective assigned mask sequence values; and
   merging, by the encryption platform, the determined mask sequence values into the data records to be used in place of the respective entries of sensitive personal information to which the mask sequence values have been assigned to safeguard the sensitive personal information.

9. The method of claim 8, further comprising purging particular entries of sensitive personal information from being assigned mask sequence values according to whether the particular entries of sensitive personal information already are included in the master translation table.

10. The method of claim 8, further comprising:
    receiving the data records from at least one data source;
    extracting the sensitive personal information and primary key information from the data records for inclusion in the data records; and
    merging the mask sequence values into the data records according to the primary key information.

11. The method of claim 8, further comprising removing the sensitive personal information from the data records prior to merging the mask sequence values into the data records.

12. The method of claim 8, further comprising including an identifier in the mask sequence value indicative of the type of sensitive personal information with which the mask sequence value is associated.

13. The method of claim 8, wherein the ordering is a random ordering.

14. The method of claim 13, wherein the sorting the plurality of entries into the ordering comprises:
   generating a set of random values;
   randomly assigning the random values to the entries of sensitive personal information and
   sorting the plurality of entries of sensitive personal information such that their respective assigned random values are in numerical order.

15. A non-transitory computer readable medium storing a software program, the software program being executable by a processor of a computing device to provide operations comprising:
   receiving, at an encryption platform executing a masking engine, a plurality of entries of sensitive personal information extracted from data records;
   sorting, by the encryption platform, the plurality of entries into an ordering;
   for each of the plurality of entries, beginning with a first one of the plurality of entries in the ordering and proceeding sequentially through the ordering, determining, by the encryption platform, a mask sequence value that is a next available value in a predetermined sequence of values and assigning the mask sequence value to the entry;
   updating, by the encryption platform, a master translation table that stores mask sequence values in association with entries of sensitive personal information such that the master translation table includes the plurality of entries of sensitive personal information in association with their respective assigned mask sequence values; and
   merging, by the encryption platform, the determined mask sequence values into the data records to be used in place of the respective entries of sensitive personal information to which the mask sequence values have been assigned to safeguard the sensitive personal information.

16. The non-transitory computer readable medium of claim 15, further providing for operations comprising purging particular entries of sensitive personal information from being assigned mask sequence values according to whether the particular entries of sensitive personal information already are included in the master translation table.

17. The non-transitory computer readable medium of claim 15, further providing for operations comprising:
   receiving the data records from at least one data source;
   extracting the sensitive personal information and primary key information from the data records for inclusion in the data records; and
   merging the mask sequence values into the data records according to the primary key information.

18. The non-transitory computer readable medium of claim 15, further providing for operations comprising removing the sensitive personal information from the data records prior to merging the mask sequence values into the data records.

19. The non-transitory computer readable medium of claim 15, further providing for operations comprising including an identifier in the mask sequence value indicative of the type of sensitive personal information with which the mask sequence value is associated.

20. The non-transitory computer readable medium of claim 15, wherein the ordering is a random ordering.

21. The non-transitory computer readable medium of claim 20, wherein the sorting the plurality of entries into the ordering comprises:
   generating a set of random values;
   randomly assigning the random values to the entries of sensitive personal information and
   sorting the plurality of entries of sensitive personal information such that their respective assigned random values are in numerical order.

\* \* \* \* \*